US010311112B2

(12) United States Patent
Buhler et al.

(10) Patent No.: US 10,311,112 B2
(45) Date of Patent: Jun. 4, 2019

(54) LINEARIZED SEARCH OF VISUAL MEDIA

(71) Applicant: Zorroa Corporation, Berkeley, CA (US)

(72) Inventors: Juan J. Buhler, Woodside, CA (US); Daniel Elliott Wexler, Soda Springs, CA (US)

(73) Assignee: Zorroa Corporation, Berkeley, CA (US)

(*) Notice: Subject to any disclaimer, the term of this patent is extended or adjusted under 35 U.S.C. 154(b) by 258 days.

(21) Appl. No.: 15/232,769

(22) Filed: Aug. 9, 2016

(65) Prior Publication Data
US 2018/0046621 A1 Feb. 15, 2018

(51) Int. Cl.
*G06F 16/93* (2019.01)
*G06F 3/0482* (2013.01)
*G06F 16/248* (2019.01)
*G06F 16/951* (2019.01)
(Continued)

(52) U.S. Cl.
CPC ............ *G06F 16/93* (2019.01); *G06F 3/0481* (2013.01); *G06F 3/0482* (2013.01); *G06F 3/04855* (2013.01); *G06F 16/248* (2019.01); *G06F 16/951* (2019.01)

(58) Field of Classification Search
CPC .. G06F 17/30554; G06F 16/93; G06F 16/248; G06F 16/951
See application file for complete search history.

(56) References Cited

U.S. PATENT DOCUMENTS

| 6,035,055 A | 3/2000 | Wang et al. |
| 2003/0009493 A1* | 1/2003 | Parker ..................... G06F 16/58 715/201 |
| 2003/0236752 A1 | 12/2003 | Dawson et al. |

(Continued)

FOREIGN PATENT DOCUMENTS

WO  WO2012/030586 A1  3/2012

OTHER PUBLICATIONS http://grouplab.cpsc.ucalgary.ca/grouplab/uploads/Publications/Publications/2008-SlitTear.AVI.pdf "Exploring Video Streams Using Slit-Tear Visualization" Tang et al. 2008.*

(Continued)

*Primary Examiner* — Sherrod L Keaton
(74) *Attorney, Agent, or Firm* — Morgan, Lewis & Bockius LLP

(57) ABSTRACT

A process displays a concatenated array of slit-compressed images corresponding to an ordered sequence of images. The slit-compressed images are concatenated along a single dimension according to the ordered sequence of images. Each slit-compressed image has an associated query that has search terms based on the respective image. The process displays a moveable slider that moves along the single dimension and identifies a current location within the array, and displays a respective thumbnail image corresponding to the current location. The process receives user input to move the moveable slider along the single dimension to a new location. The process displays a thumbnail representation of the image corresponding to the new location and executes the query corresponding to the current image to retrieve documents from a document repository related to the current image. The process then displays the retrieved documents for user selection.

19 Claims, 13 Drawing Sheets

(51) Int. Cl.
*G06F 3/0481* (2013.01)
*G06F 3/0485* (2013.01)

(56) References Cited

U.S. PATENT DOCUMENTS

| | | |
|---|---|---|
| 2004/0070678 A1 | 4/2004 | Toyama et al. |
| 2005/0154754 A1 | 7/2005 | Sheldon et al. |
| 2005/0160079 A1 | 7/2005 | Turski et al. |
| 2007/0273702 A1 | 11/2007 | Ishii |
| 2008/0304808 A1 | 12/2008 | Newell et al. |
| 2009/0009493 A1* | 1/2009 | Hong ............... G09G 3/3648 345/204 |
| 2009/0106271 A1 | 4/2009 | Chieu et al. |
| 2009/0157638 A1 | 6/2009 | Flynn et al. |
| 2009/0164946 A1 | 6/2009 | Liddington |
| 2009/0203368 A1* | 8/2009 | Marsyla ............... G06F 9/45512 455/418 |
| 2009/0208116 A1 | 8/2009 | Gokturk et al. |
| 2011/0022394 A1 | 1/2011 | Wide |
| 2011/0047163 A1 | 2/2011 | Chechik et al. |
| 2011/0145232 A1* | 6/2011 | Chang ............... G06F 16/904 707/728 |
| 2012/0304247 A1 | 11/2012 | Badger et al. |
| 2015/0016700 A1* | 1/2015 | Drozdzal ............... G16H 40/63 382/128 |
| 2015/0296228 A1 | 10/2015 | Chen et al. |
| 2015/0347505 A1* | 12/2015 | Ohashi ............... G06F 19/321 707/754 |
| 2016/0065547 A1 | 3/2016 | Heinrich et al. |

OTHER PUBLICATIONS

Zorroa Corporation, International Search Report and Written Opinion, PCT/US2015/060922, dated Mar. 9, 2016, 9 pgs.
Tang, "Exploring Video Streams Using Slit-Tear Visualization," Tang et al. 2008, from: http://grouplab.cpsc.ucalgary.ca/grouplab/uploads/Publications/Publications/2008-SlitTear.AVI.pdf.
Zorroa Corporation, International Preliminary Report on Patentability, PCT/US2015/060922, dated May 16, 2017, 6 pgs.
Wexler, Office Action, U.S. Appl. No. 14/941,502, dated May 4, 2018, 17 pgs.
Wexler, Office Action, U.S. Appl. No. 15/232,759, dated May 17, 2018, 11 pgs.
Wexler, Final Office Action, U.S. Appl. No. 14/941,502, dated Dec. 7, 2018, 15 pgs.
Wexler, Final Office Action, U.S. Appl. No. 15/232,759, dated Nov. 8, 2018 14 pgs.

* cited by examiner

LINEARIZED SEARCH OF VISUAL MEDIA

CROSS REFERENCE TO RELATED APPLICATIONS

This application is related to U.S. patent application Ser. No. 14/941,502, filed Nov. 13, 2015, entitled "Systems and Methods of Building and Using an Image Catalog," which is incorporated herein by reference in its entirety.

TECHNICAL FIELD

The disclosed implementations relate generally to searching a document repository and more specifically to retrieving search results using a linearized visual representation of a sequence of images.

BACKGROUND

Within a collection of documents, it can be very difficult to find relevant documents (or pages within a document), especially when the number of documents is very large or the documents are images. Even if a user can create an appropriate query, it can be slow, and then the user is confronted with constructing many more queries to identify other relevant documents. In addition, user interfaces do not provide a simple way to reuse queries. Even when a query can be saved, it is saved as a text string, or requires extra work for a user to assign a name to the query. In neither case is the query easy to retrieve among a long query list, particularly to other users or after sufficient time has passed for the user to forget. Also, user assigned query names may be cryptic or not accurately describe the query.

SUMMARY

Disclosed implementations address some of the problems of searching a document repository. Some implementations are particularly suited for searching a repository of images. Implementations provide a visual way to search a document repository using a linear array of images, each of which is compressed into a slit (e.g., a single row of pixels or a single column of pixels). Stacking the slit-compressed images together forms a slitscan visual representation, as illustrated in FIG. 5B below. Because of the compression into slits, a large number of images can fit into a slitscan visual representation on a display screen. When the number of images is very large, some implementations average or sample the slit-compressed images.

The slitscan visual representation is used as the background for a slider widget, which enables user selection of an image within the array. In some implementations, the slider thumb itself includes a visual representation (e.g., thumbnail image) of the currently selected image, as illustrated in FIG. 6A. Alternatively, some implementations display a visual representation of the currently selected image at another location in the user interface, and use a smaller slider thumb, as illustrated in FIG. 6C.

Each image (or most of the images) in the linear array has an associated search query, and the search query for a particular image is executed when the particular image is selected (e.g., when the slider thumb is positioned on the particular image or remains on the particular image for a threshold amount of time, such as 0.2 seconds).

Typically, the linear array of images is ordered based on some characteristic of the images, such as the time sequence of frames in a video. Because of this, adjacent images can be grouped into segments. Some implementations associate the search queries with segments instead of associating a search query directly with each image. In this case, each image is associated with a search query indirectly based on the segment that includes the image. The segments generally cover most of the slitscan representation, as illustrated in FIG. 7.

Some implementations provide additional information about the images and/or queries in additional visual representations adjacent to the slitscan visual representation. FIGS. 8A and 8B illustrate some examples. In some implementations, a user can interact directly with the additional visual representations to select an image, and the slider thumb is automatically moved to the new location.

To form a slitscan visual representation, a quantized visual representation for each image (or contiguous range of images) is compressed into a column or row, and the compressed rows or columns are concatenated. For example, for a video, each frame in the video can be quantized into a single column. In some implementations, each pixel in the column represents the average or best color for the corresponding row of video frame. The per-frame columns are packed together to represent the entire film. The slitscan visual representation allows for instant visual scanning of the content, with strong patterns in color providing visual cues for moving the slider to specific ranges.

The search query for each segment can be specified manually or can be constructed from external data that is correlated with the linear array of images. For example, with a video, a timecode for a segment can be used as a search query. Alternatively, the dialog (e.g., available from closed captioning) for each shot and the character names of characters appearing in the segment can be used as the search keywords, which matches documents that may not have any associated timecode field. Segments can be irregular, and may not completely cover the entire array of images, as illustrated in FIG. 7.

In accordance with some implementations, a method is performed at a computing system having one or more processors and memory. The process displays a slitscan graphic that includes a concatenated array of slit-compressed images. The slit-compressed images correspond to an ordered sequence of images. The slit-compressed images are concatenated along a single dimension (horizontally or vertically) in order according to the ordered sequence of images. In some implementations, a majority of the slit-compressed images are subdivided into a plurality of segments that are contiguous within the concatenated array, and each segment has a corresponding query that has search terms based on the images in the segment. The process displays a moveable slider that moves along the single dimension and identifies a current location within the slitscan graphic. The process displays a thumbnail representation of the image corresponding to the current location of the moveable slider.

The process receives user input to move the moveable slider along the single dimension to a new location. In response to the user action, the process displays a thumbnail representation of the image corresponding to the slit-compressed image at the new location, determines that the new location corresponds to a first segment of the plurality of segments, and executes the query corresponding to the first segment. The query retrieves documents from a document repository related to the image at the new location and displays the retrieved documents for user selection.

In some instances, the ordered sequence of images are frames of a video. In some of these instances, the process generates the query for each segment based on dialog in the video corresponding to the segment.

In some instances, the ordered sequence of images are pages within a document. For example, in some cases, the images are pages within a PDF document, where each page has an image. In other cases, the images are pages within an image document, such as multi-page TIFF.

In some instances, the ordered sequence of images is formed by partitioning a single elongated image into a plurality of slices, and the plurality of slices are ordered based on their respective positions within the elongated image. For example, a well log image may be very long in one dimension, and can be split into manageable chunks or slices (e.g., corresponding to 1 foot sections, 2 foot sections, or five foot sections). Note that individual well images could also be snapped in succession, creating an ordered sequence of images directly with order based on depth into the well. This methodology can be applied to other elongated images as well, such as a panoramic image.

In some instances, the ordered sequence of images consists of time lapse images of a single location taken over some interval of time.

In some implementations, the thumbnail representation is displayed within the moveable slider, and the moveable slider is displayed within the slitscan graphic, splitting the slitscan graphic into two portions. Alternatively, some implementations display the thumbnail representation in a region distinct from the moveable slider and distinct from the slitscan graphic (e.g., adjacent to the slitscan graphic).

In some implementations, each slit-compressed image is formed by compressing an image along the single dimension to create a single line of pixels. For example, if the single dimension is horizontal, horizontal compression results in vertical lines of pixels. If the single dimension is vertical, vertical compression creates horizontal lines of pixels. In some implementations, the width of each slit-compressed image is a single pixel (particularly when there is a very large number of images, such as a full-length video). On the other hand, when the number of images is small, some implementations create slit-compressed images that are wider than a single pixel.

In some implementations, compression of an image involves computing a "color average." For example, when the single dimension is horizontal, each slit-compressed image is a vertical line of pixels, and each pixel in a vertical line of pixels is formed by computing a color average of all pixels in a corresponding row of the image. In some implementations, computing a color average involves determining a dominant color of all pixels in the corresponding row of the respective image. In some instances, the original images have a very high resolution. In some implementations, very high resolution images are downsampled prior to computing the slit-compressed images. For example, an image that has 2K×2K pixels may be downsampled to 512×512, computing a representative color value for each 4×4 square of pixels.

In some implementations, the process dynamically updates the displayed thumbnail image while a user moves the moveable slider, displaying a thumbnail image corresponding to locations of the moveable slider as it moves.

In some implementations, other information related to the slitscan graphic and/or the document repository is displayed in conjunction with the slitscan graphic. Typically the data is displayed over the entire range of the slitscan graphic and aligned so that a user can visually correlate the additional data to the slit-compressed images.

In some implementations, the process displays a graphic representation of counts of query results corresponding to each slit-compressed image in the slitscan graphic, which is visually aligned with the slitscan graphic.

In some implementations, the process retrieves data values for a data field that stores data for the ordered sequence of images and the process displays a graphic representation of the retrieved data values visually aligned with the slitscan graphic. For example, a data field may store the date/time that each of the images was captured, and the time of day for each of the images can be displayed.

In some implementations, the process displays a binary graphic representation that identifies which slit-compressed images in the slitscan graphic have queries that match the query corresponding to the first segment. For example, some implementations display an array of tick marks aligned with the slit-compressed images, which looks somewhat like a bar code. The presence of a tick mark indicates that the corresponding slit-compressed image has a query matching the query of the first segment. In some implementations, a query "matches" the query corresponding to the first segment when there is at least one keyword that appears in both the respective query and the query corresponding to the first segment. In some implementations, a match requires more than a single overlapping keyword.

In accordance with some implementations, a computer system has one or more processors, memory, and one or more programs stored in the memory. The programs are configured for execution by the one or more processors. The programs include instructions for performing any of the processes described herein.

In accordance with some implementations, a non-transitory computer readable storage medium stores one or more programs that are configured for execution by one or more processors of a computer system. The programs include instructions for performing any of the processes described herein.

DESCRIPTION OF IMPLEMENTATIONS

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
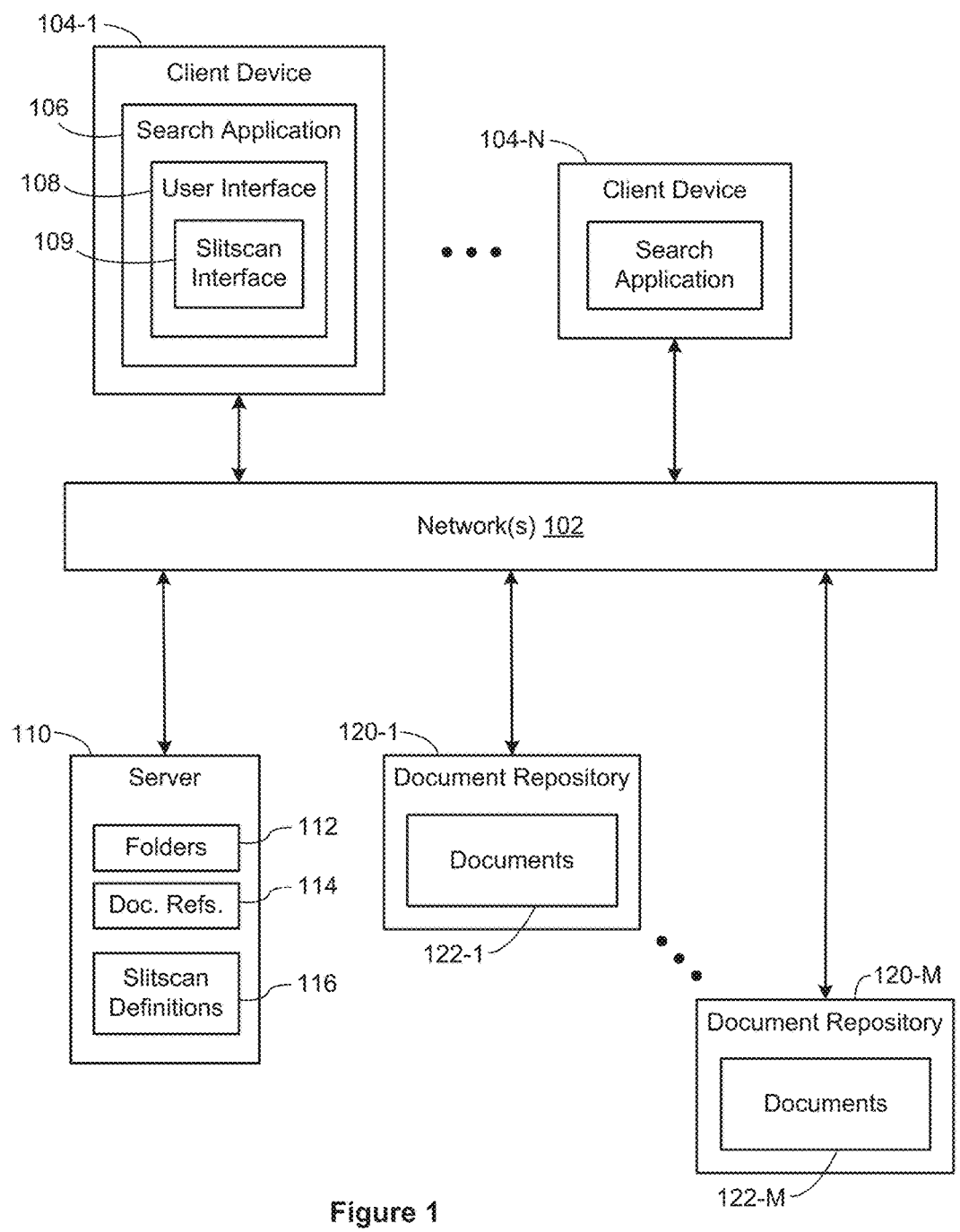
FIG. 1 is a block diagram of a context in which some implementations operate.

FIG. 1 illustrates a context in which some implementations operate. Document repositories 120 (e.g., 120-1 to 120-M) store documents 122 (e.g., documents 122-1 to 122-M). A typical document repository 120 may store millions of documents or more. In some implementations, the documents are text documents. In some implementations, the documents are images (e.g., JPEG, TIFF, PNG, GIF, BMP, CGM, or SVG). In some implementations, the documents are media files, such as movies or sound recordings. In some implementations, the documents in a repository 120 are all of the same type, but some repositories 120 include a heterogeneous collection of documents.

In the illustrated implementation, there is a separate server 110, which stores information about the documents 122 in the repositories 120. In some implementations, a server 110 stores one or more document repositories 120, but typically the server 110 is distinct from the repositories 120. The server includes a database of document references 114, which store information about the documents. A skeletal data structure for the document references 114 is illustrated below in FIG. 4A. A document reference contains information about a document, but does not store the document itself (but may contain a thumbnail image or document extract).

The server 110 here also stores a set of search folders 112. Each search folder provides a definition of what documents to include. The server also stores one or more slitscan definitions 116. A slitscan definition 116 is used to display a slitscan interface 109 on client devices 104, providing a fast and effective way to find and retrieve documents. A skeletal data structure slitscan definitions 116 is illustrated below in FIG. 4B. In some implementations, a slitscan definition 116 includes image segments.

The data in the servers 110 and the document repositories 120 are accessed by client devices 104 running a search application 106. The search application 106 provides a user interface 108. In some circumstances, the user interface 108 includes a slitscan interface 109, which enables a user to quickly query and access many interrelated documents. The communication between the client devices 104, server 110, and document repositories 120 is over one or more networks 102, such as local networks and the Internet.

In some implementations, some or all of the functionality described with respect to the server 110 is performed by the client device 104.

Figure 2:
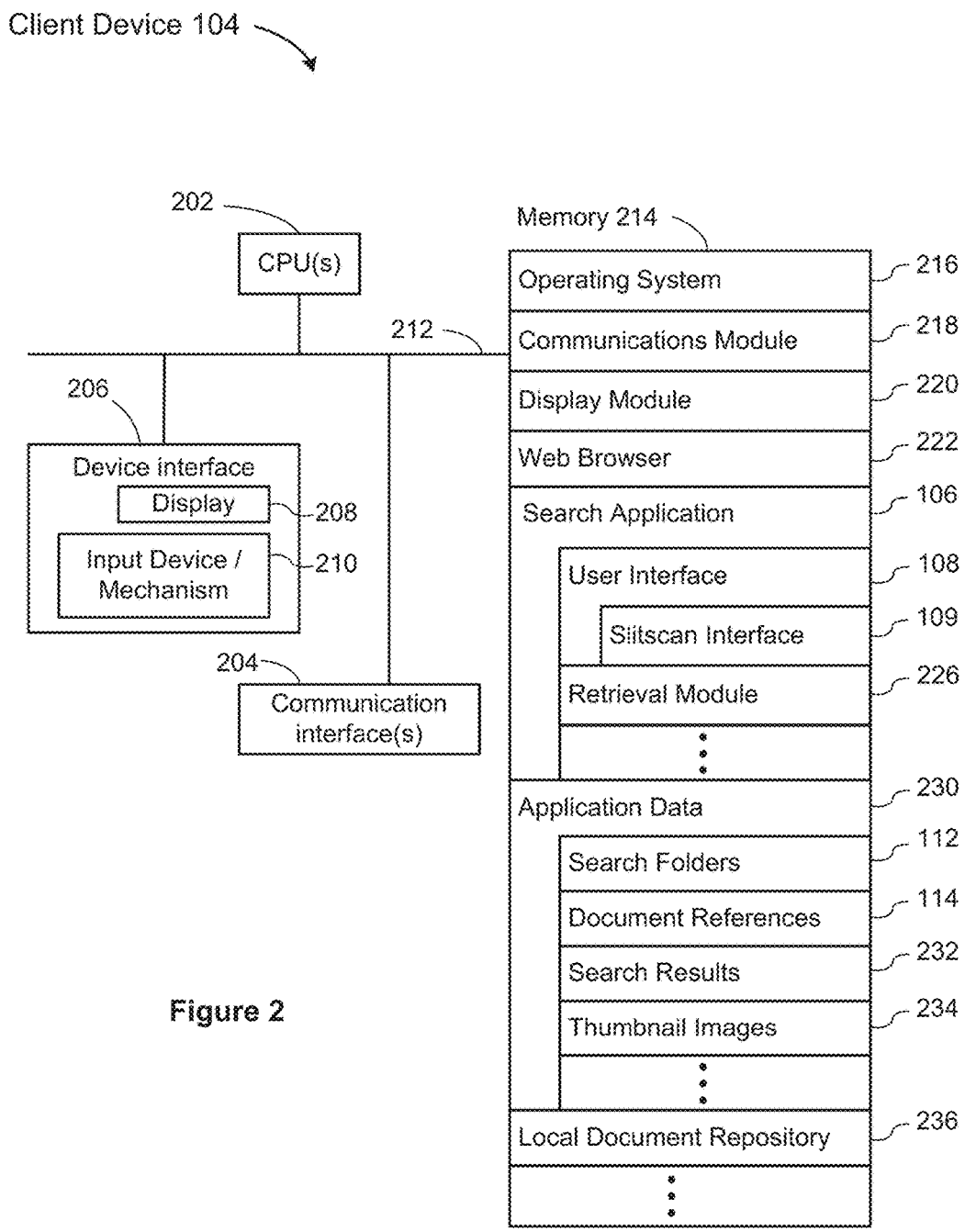
FIG. 2 is a block diagram of a client device in accordance with some implementations.

FIG. 2 is a block diagram illustrating a client device 104 that a user uses to access a search application 106. A client device is also referred to as a computing device, which may be a tablet computer, a laptop computer, a smart phone, a desktop computer, a PDA, or other computing device than can run the search application 106 and has access to a communication network 102. A client device 104 typically includes one or more processing units (CPUs) 202 for executing modules, programs, or instructions stored in the memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 104 includes a device interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the client device 104 to other computers and devices via the one or more communication network interfaces 204 (wired or wireless) and one or more communication networks 102, such as the Internet, other wide area networks, local area networks, metropolitan area networks, and so on;
- a display module 220, which receives input from the one or more input devices 210, and generates user interface elements for display on the display device 208;
- a web browser 222, which enables a user to communicate over a network 102 (such as the Internet) with remote computers or devices;
- a search application 106, which enables a user to search and retrieve documents from one or more remote document repositories 120 or local document repository 236. The search application 106 provides a user interface 108. When available, the user interface 108 provides a slitscan interface 109, as illustrated in FIGS. 6A, 6B, 6C, 9A, and 9B. The search application 106 also includes a retrieval module 226, which retrieves documents corresponding to a search folder or retrieves document summaries for the documents corresponding to the search folder; and
- application data 230, which includes a set of search folders 112, a set of document references 114, search results 232 corresponding to a search folder, and thumbnail images 234 (or document summaries) for the documents in a search folder.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 104, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
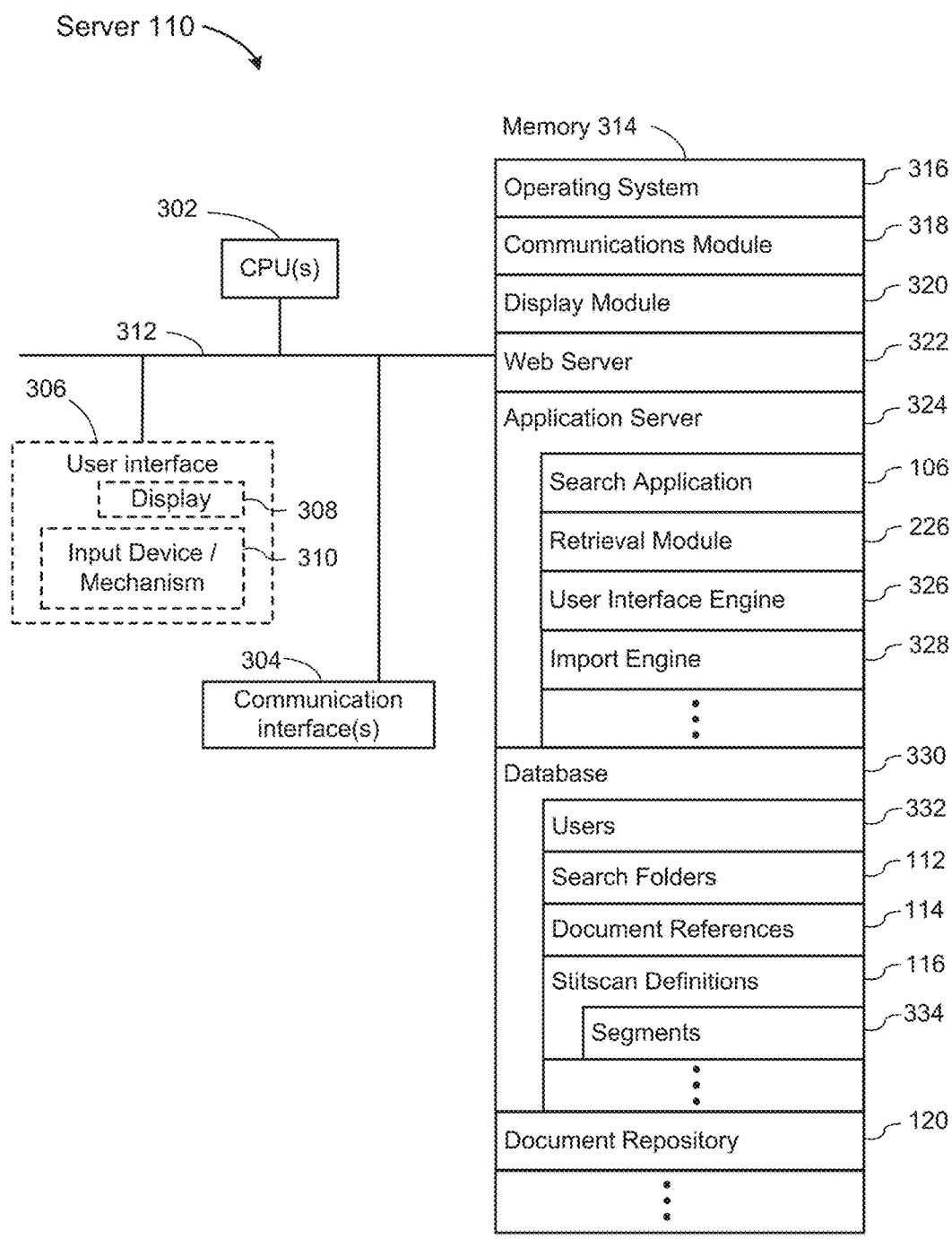
FIG. 3 is a block diagram of a server in accordance with some implementations.

FIG. 3 is a block diagram illustrating a server 110. In some implementations, a server 110 is one of a plurality of servers in a server system. A server 110 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 110 includes a user interface 306, which may include a display device 308 and one or more input devices 310, such as a keyboard and a mouse.

Figure 4A:
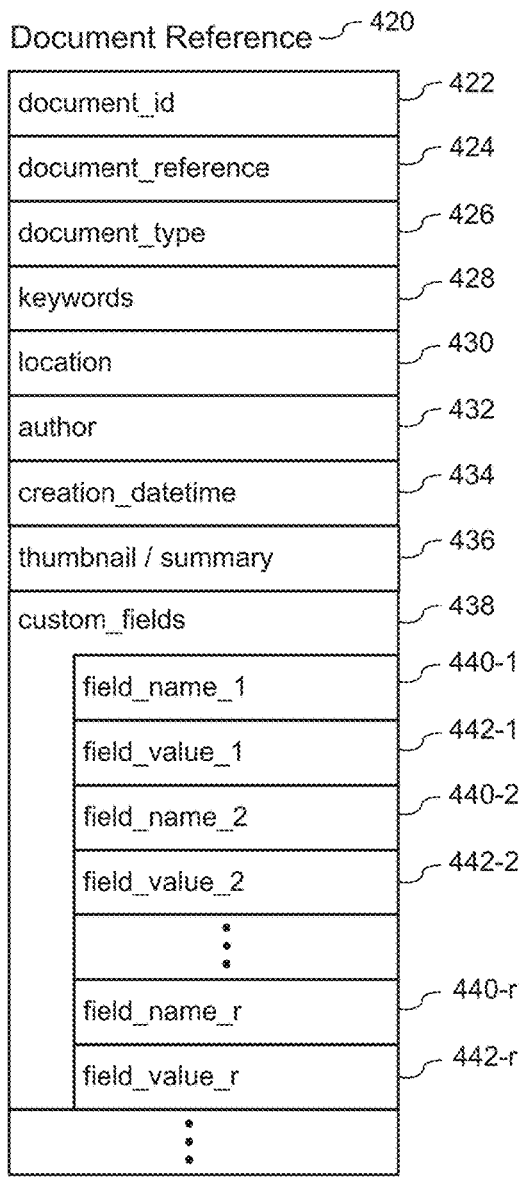
FIG. 4A is a skeletal data structure for storing a reference to a document in accordance with some implementations.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer readable storage medium. In some implementations, the memory 314, or the computer readable storage medium of the memory 314, stores the following programs, modules, and data structures, or a subset thereof:

- an operating system 316, which includes procedures for handling various basic system services and for performing hardware dependent tasks;
- a communications module 318, which is used for connecting the server 110 to other computers via the one or more communication network interfaces 304 (wired or wireless) and one or more communication networks 102, such as the Internet, other wide area networks, local area networks, metropolitan area networks, and so on;
- a display module 320, which receives input from one or more input devices 310, and generates user interface elements for display on a display device 308;
- one or more web servers 322, which receive requests from a client device 104, and return responsive web pages, resources, or links. In some implementations, each request is logged in the database 330;
- one or more application servers 324, which provide various applications (such as a search application 106) to the client devices 104. In some instances, applications are provided as a set of web pages, which are delivered to the client devices 104 and displayed in a web browser 222. The web pages are delivered as needed or requested. In some instances, an application is delivered to a client device 104 as a download, which is installed and run from the client device 104 outside of a web browser 222;
- in some implementations, the application server provides a retrieval module 226 as part of the search application 106. In other implementations, the retrieval module 226 is a separate application provided by the application server 324. The retrieval module retrieves documents corresponding to a search folder or document summaries for the documents corresponding to the search folder;
- some implementations include a user interface engine 326, which provides the user interface 108 and slitscan interface 109 for users of the search application 106;
- the search application 106 also includes an import engine 328, which adds new document references 114 to the database 330. Typically, the actual content of the imported documents remains in the original document repository, and is not copied. Some implementations use a Document References table 420, as illustrated in FIG. 4A. During an import process, the import engine 328 executes procedures to determine the values of the data structure elements, including the fields 438. This is described in more detail below with respect to FIG. 4A;
- one or more databases 330, which store various data used by the modules or programs identified above. In some implementations, the database 330 includes a list of authorized users 332, which may include user names, encrypted passwords, and other relevant information about each user. The database 330 also stores the search folder definitions 112 as well as the document references 114;
- the database 330 also stores one or more slitscan definitions 116, which are used by the user interface engine 326 or the search application user interface 108 to display a slitscan interface 109. In some implementations, a slitscan definition 116 includes one or more segments 334, which are groupings of contiguous images in a slitscan graphic that have the same associated search query. The slitscan definitions and segments are described below with respect to FIG. 4B; and
- in some cases, the server 110 includes a document repository 120, which contains the actual document contents (e.g., images).

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 illustrates a server 110, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a search application may be shared between a client device 104 and a server system 110. In some implementations, after the search application is installed on a client device 104, the majority of the subsequent processing occurs on the client device. For example, the document references 114 may be stored solely at the client device 104, and not on a server 110. In other implementations, the majority of the processing and data storage occurs at a server 110, and the client device 104 uses a web browser 222 to view and interact with the data. For example, the document references 114 may be stored only at the server system 110. One of skill in the art recognizes that various allocations of functionality between the client device 104 and the server system 110 are possible, and some implementations support multiple configurations (e.g., based on user selection).

FIG. 4A shows a skeletal document references table 420. Each record in the document references table 420 identifies a document in one of the document repositories 420. Each document is uniquely identified by a document ID 422, and includes a document reference pointer 424 to identify the location of the document. For example, the document reference may specify a full path name, including server, volume, path, and file name for a document stored on a local area network, or a URL with a file name for documents retrieved over the Internet. Some implementations store a document type 426 for each document. In some implementations, the document type 426 corresponds to the file name extension of the document, such as "PDF", "JPEG", "TIFF", "PNG", "BMP", "TXT", and so on. In some implementations, the document type specifies a general category for each document, such as "TEXT" or "IMAGE".

In some implementations, the document references table includes a list of keywords 428 for each document. In some implementations, the keywords are indexed. In some implementations, the keywords are indexed, and not included in the document references table.

In some instances, location information is available for the documents, which identifies where the document was created. For example, when the documents are images, GPS coordinates may be available for some of the images, and these coordinates are stored as a location 430 for the document.

In some implementations, other metadata is stored for each document, such as an author 432 and/or a creation datetime 434.

In some implementations, the document references table also includes a thumbnail image or document summary 436. For images, this is typically a small low-resolution copy of the image that can be used for reviewing many images at the same time. For textual documents, some implementations generate a summary or abstract of the document, such as a title and some key sentences.

In addition to the typical metadata stored for documents, some implementations enable extraction of other custom fields as well. For example, for a collection of images for major league baseball, each of the images could be assigned one or more team names, one or more player names, one or more corporate names whose logos are captured in the images, and so on. This information can be stored in the custom fields 438. In some implementations there is a fixed number of possible custom fields, and a field name can be assigned to each one. In other implementations, there is a collection of field_name/field_value pairs, and the number is not limited. One of skill in the art recognizes that there are multiple ways to store such custom data. In the illustrated implementation, there is a fixed set of r field names (field_name_1 440-1, field_name_2 440-2, . . . , field_name_r 440-r) and r corresponding field values (field_value_1 442-1, field_value_2 442-2, . . . , field_value_r 442-r). In some implementations, all of the documents within one collection share the same set of custom fields. In other implementations, each collection has a set of custom fields that are defined, and only the ones that have corresponding values are stored.

The document references table 420 is typically populated by the import engine 328 during an import process. The user specifies various parameters for an import operation, such as a location of the repository, a directory of files in the repository, an optional filter of which documents to select, and so on. In some instances, the user specifies which custom fields to populate during the import process. Some of the techniques used for extracting information during the import process are described in application Ser. No. 14/941,502, filed Nov. 13, 2015, entitled "Systems and Methods of Building and Using an Image Catalog," which is incorporated herein by reference in its entirety.

Figure 4B:
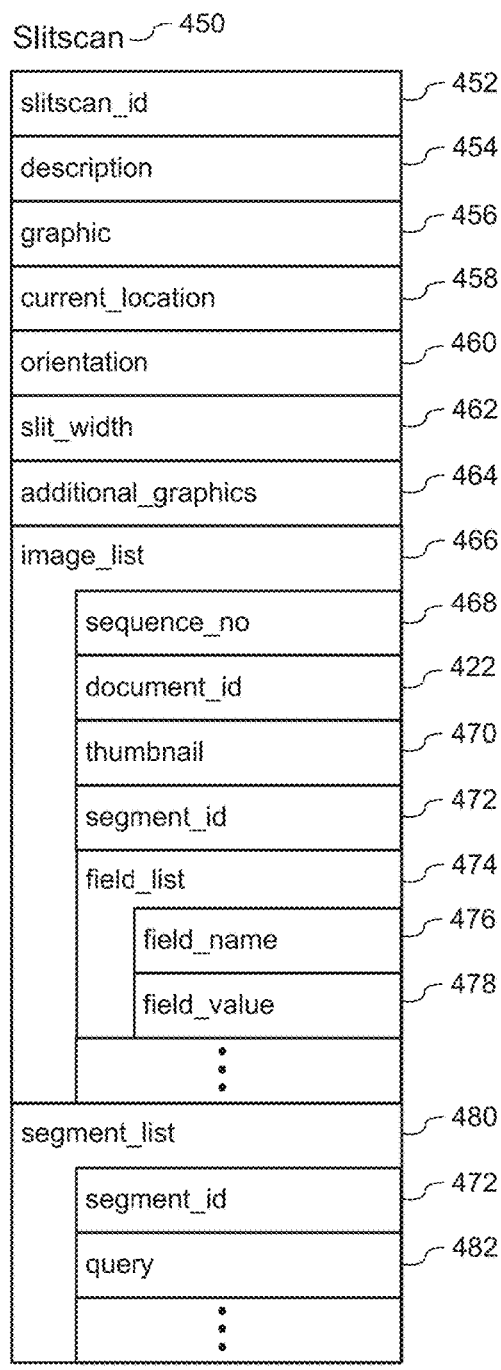
FIG. 4B is a skeletal data structure for storing slitscan definitions in accordance with some implementations.
Figure 8A:
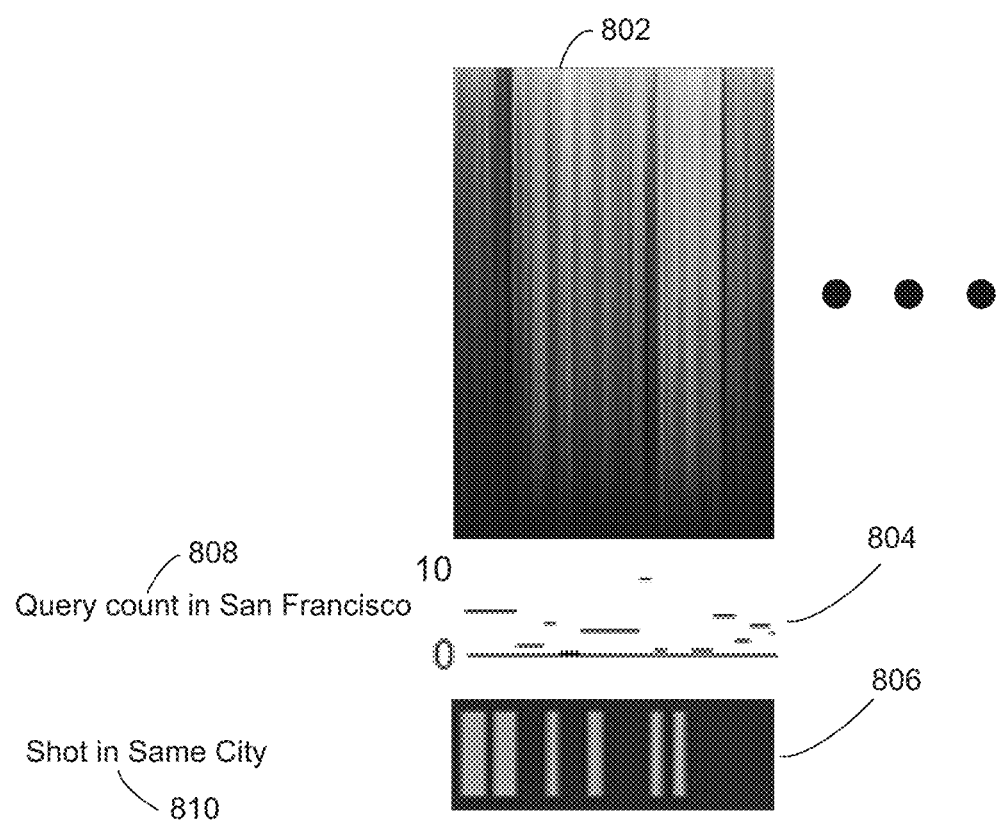
FIGS. 8A and 8B illustrate other graphic representations and data that can be displayed as part of a slitscan user interface in accordance with some implementations.
Figure 8B:
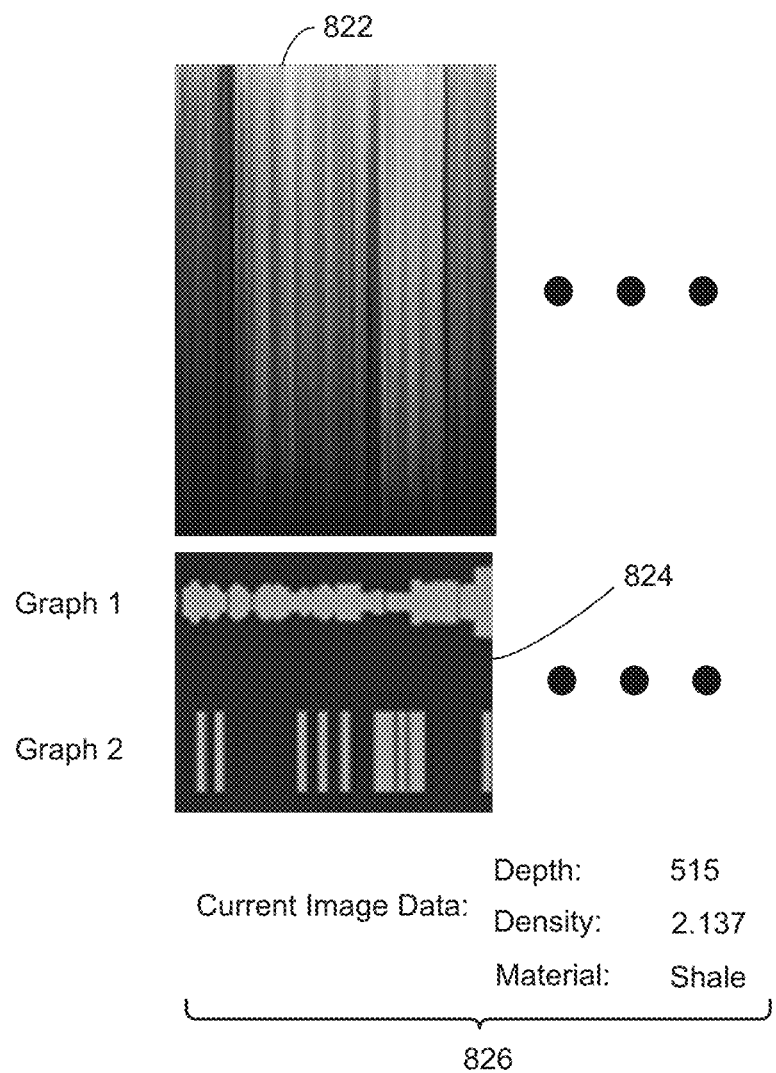

FIG. 4B shows a skeletal slitscan definition data structure 450. Each slitscan definition typically has a unique slitscan identifier 452 and a description 454. The slitscan structure 450 also includes the graphic itself 456, such as the one illustrated in FIG. 5B below. Depending on the number of images in the slitscan representation, the processing power of the client device 104, available bandwidth, and so on, the graphic 456 can be pre-generated at the server 110, dynamically generated at the server 110, or dynamically generated at the client device 104. Whether the graphic 456 is dynamically generated or pre-generated can also depend on whether the image_list 466 can change dynamically. The slitscan definition also includes the orientation 460 (horizontal or vertical) and the slit width 462 (which defaults to 1 pixel). A slitscan user interface 109 typically includes one or more additional graphics 464, such as query counts. Some examples of other graphics are shown in FIGS. 8A and 8B below.

When a slitscan interface 109 is displayed, the process tracks the current location 458 of the slider thumb. In some implementations, the current location 458 is stored in the slitscan data structure 450.

The slitscan data structure 450 also includes information to identify a thumbnail image 470 corresponding to the current location of the slider thumb and to identify a query 482 corresponding to the current location of the slider thumb.

The skeletal data structure 450 in FIG. 4B provides one example of how this information can be stored. This data structure 450 stores an image list 466, which identifies each of the images that appears in the graphic 456. Each image has a sequence number 468, which is the numeric order that the image appears in the linear array of images. In some cases, the images used in the slitscan representation are images that are stored in a repository 120, so the image list specifies the document identifier 422 of the corresponding document.

When each of the images in the slitscan linear array is a single document from the repository, the document identifier 422 uniquely identifies the image. However, there are several cases where a single document leads to multiple images. In a first case, the document (such as a PDF), consists of multiple images, and each of those images is a separate image in the slitscan representation. In another case, an elongated image (such as a well log), is sliced into multiple chunks, and each of the chunks is a separate image in the slitscan representation. In some implementations, the image list 466 includes a sub_sequence identifier, which specifies the page, chunk, or other sequential subdivision within the document. (The sub_sequence identifier defaults to 1.)

In some implementations, the image list 466 includes a thumbnail image 470. This can be particularly useful for implementations where a single document can have multiple images. For documents with a single image, some implementations use the thumbnail/summary 436 stored in the document reference table 420.

In the illustrated implementation, the image list 466 includes a segment identifier 472, which specifies the segment to which the image belongs. In other implementations, each image specifies its query 482 directly, without using segments. In some implementations, each segment consists of a single contiguous list of images in the graphic 456, so a segment can be specified by beginning and ending sequence numbers 468. Other implementations allow segments to consist of non-contiguous images as long as they have the same query.

In some implementations, the image list also stores one or more data fields 474 associated with each image. Each data field has both a field name 476 and a field value 478. Implementations typically allow an unlimited number of these data fields. Because these field values 478 are associated with a single image, they can be different from the custom fields 438 for a document when the document corresponds to multiple images. In some implementations, when a specific image is selected within the slitscan representation, some of the field values 478 for the selected image are displayed in the slitscan interface 109. This is illustrated below in FIG. 8B.

Figure 5A:
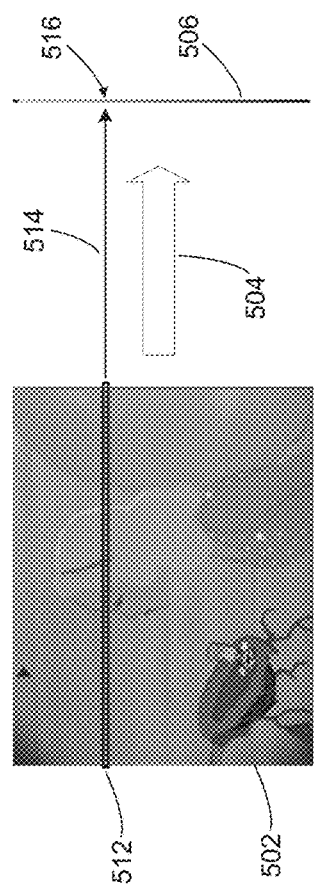
FIG. 5A illustrates how an individual image is compressed into a slit in accordance with some implementations.

FIG. 5A illustrates how an individual image 502 is compressed (504) into a slit 506 in accordance with some implementations. Based on the desired pixel size in the slit 506, the image 502 is quantized. This typically includes combining groups of pixels from the original image, which are typically squares or rectangles. This is sometimes referred to as downsampling. When multiple pixels from the original image are combined, a color average is computed. For example, if the colors in the image are stored as RGB values, some implementations compute separate arithmetic averages for the R, G, and B components, and uses those averages as the RGB values for the overall color. In some implementations, a dominant color is identified. Some implementations use alternative color averaging techniques and/or combine two or more techniques. For example, some implementations use the dominant color when there is a definitive dominant color, and computes an arithmetic average otherwise.

In this example, after the image 502 is quantized, each row is averaged to form a single pixel in the final slit. In FIG. 5A, an example row 512 is identified, and it is compressed (514) into a single pixel 516. The averaging for a row is similar to the averaging performed in the quantization process. Some implementations perform a single averaging operation rather than two separate operations. For example, using the data from the original image 502, some implementations form a "row" whose height is more than a single pixel of the original image, and all of the original pixels for that row are averaged to compute a single pixel in the resulting slit 506. In this case, the sample row 512 illustrated in FIG. 5A may have a height of several pixels, depending on the resolution of the original image 502.

The process illustrated in FIG. 5A can be applied vertically instead, compressing columns of the original images to form a horizontal slit.

The compression of images into slits can also be performed more holistically rather than compressing each row separately into a single pixel. For example, some implementations downsample the full resolution image to a smaller resolution so that the total number of pixels in the downsampled image is equal to the desired final pixel height for the slit. For example, if the desired height of each slit is 100 pixels, the original image is downsampled to 100 pixels. Because the averaging performed is more localized, it tends to produce better results than averaging full rows. Once a full image is downsampled to the desired number of pixels, the process arranges the pixels into a column, sorted by hue. This results in a smoother slitscan graphic. In some case, near-white and near-black pixels can tend to dominate, so additional techniques are applied. For example, the process can apply a threshold when building the sorted pixel hue list.

When the number of images selected for a slitscan is very large (e.g., frames of a video), the set of images can be sampled. For example, a one-hour video with 30 frames per second has 108,000 images. In this case, for example, the slitscan image may be generated using every 30th image, every 50th image, or every 100th image.

Figure 5B:
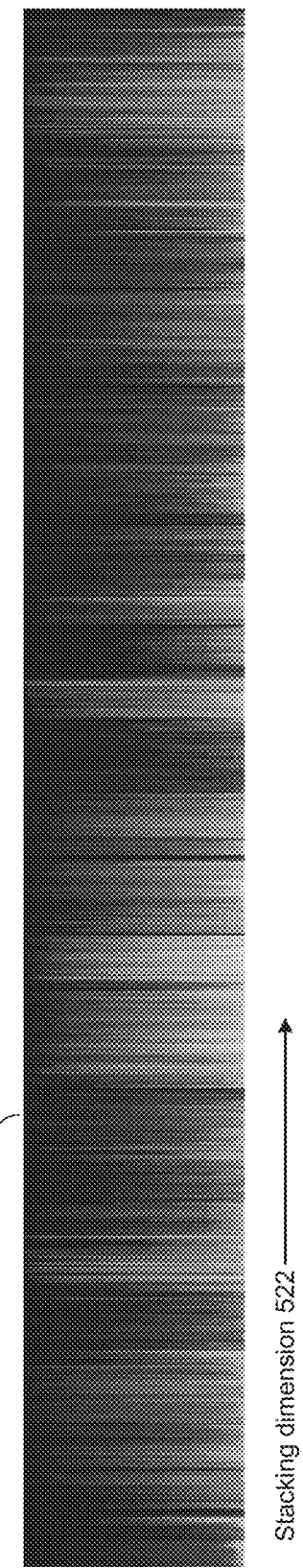
FIG. 5B illustrates a slitscan visual representation created by stacking many individual slits together along an axis, in accordance with some implementations.

FIG. 5B illustrates a slitscan visual representation 520 created by stacking many individual slits 506 together along an axis 522, in accordance with some implementations. Although each individual slit is very thin, certain patterns emerge because of similarity between adjacent images. This is particularly apparent when the slitscan graphic 520 is displayed in color.

Figure 6A:
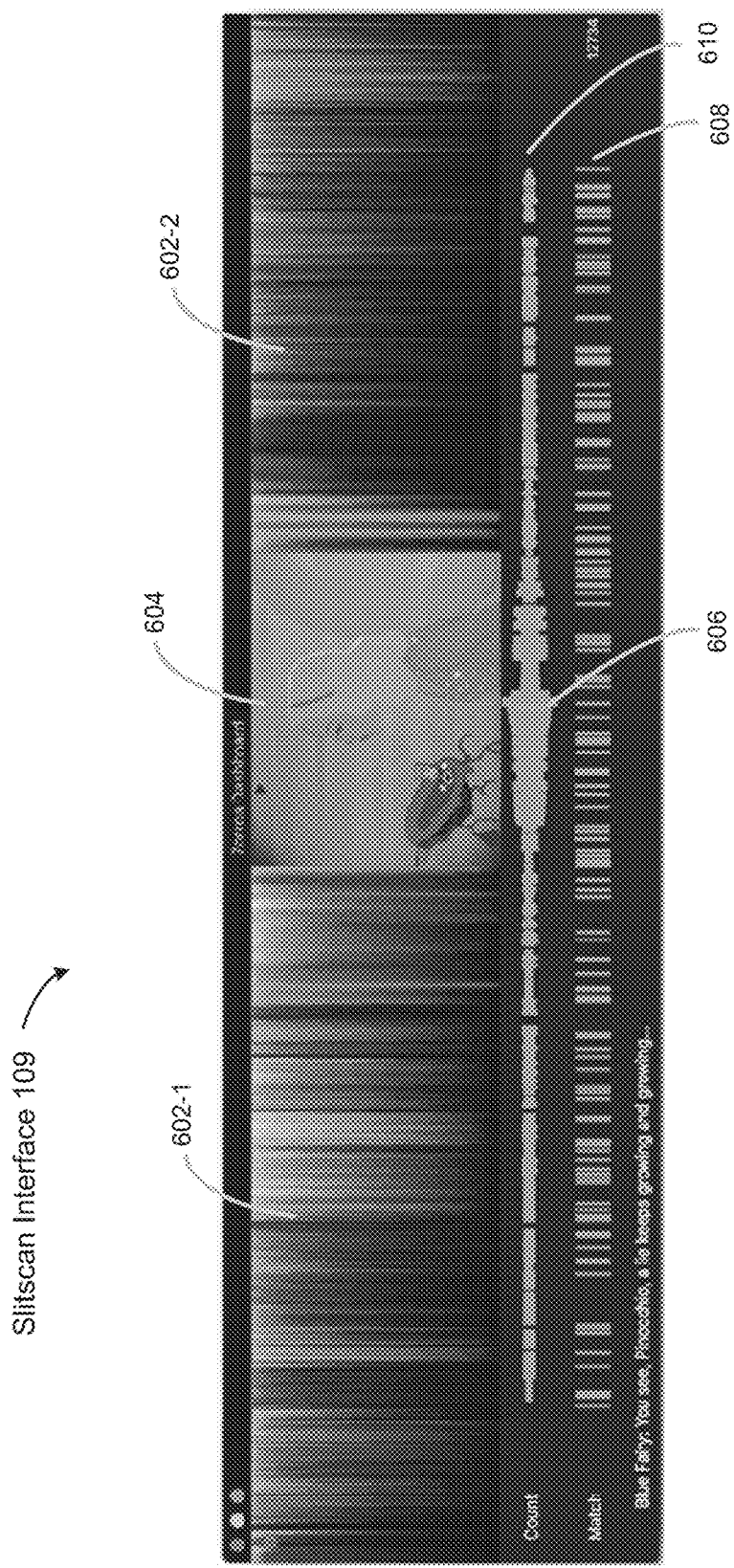
FIGS. 6A-6C illustrate variations of a slitscan interface in accordance with some implementations.
Figure 6B:
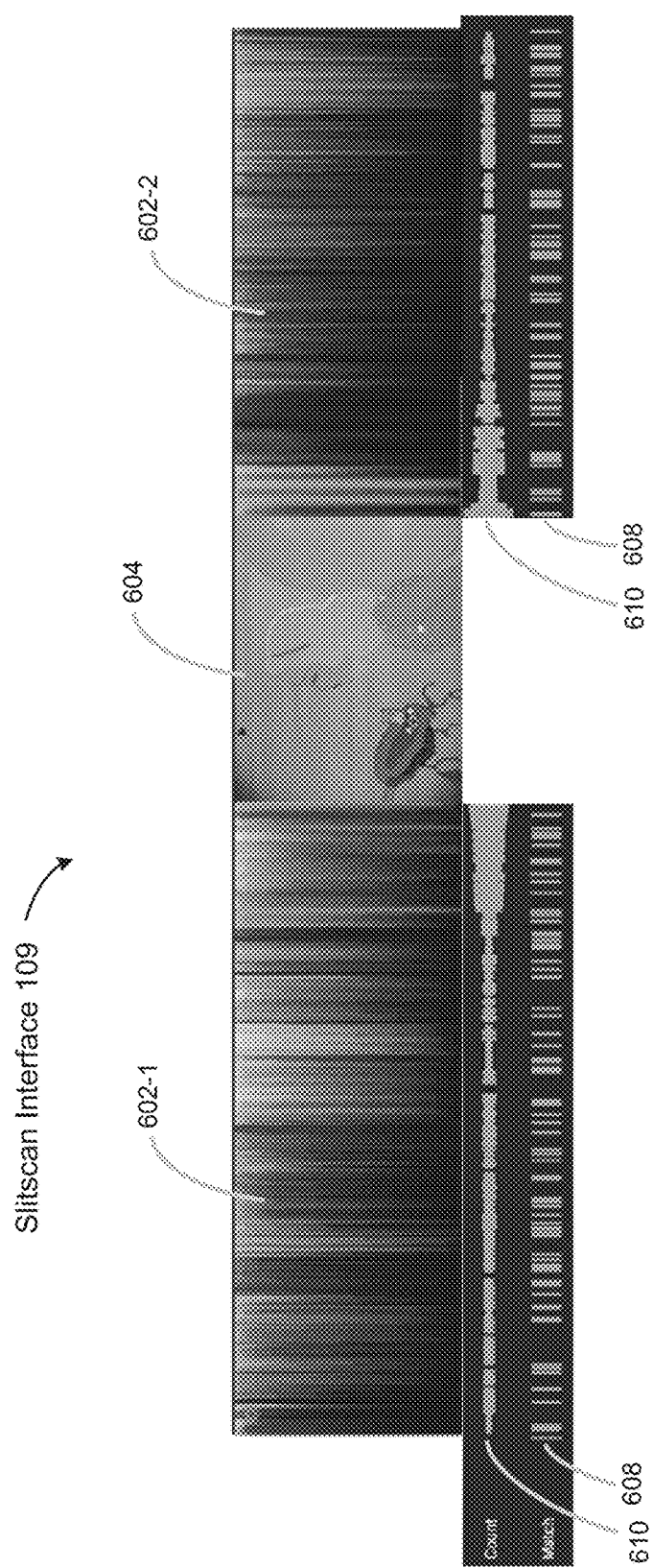
Figure 6C:
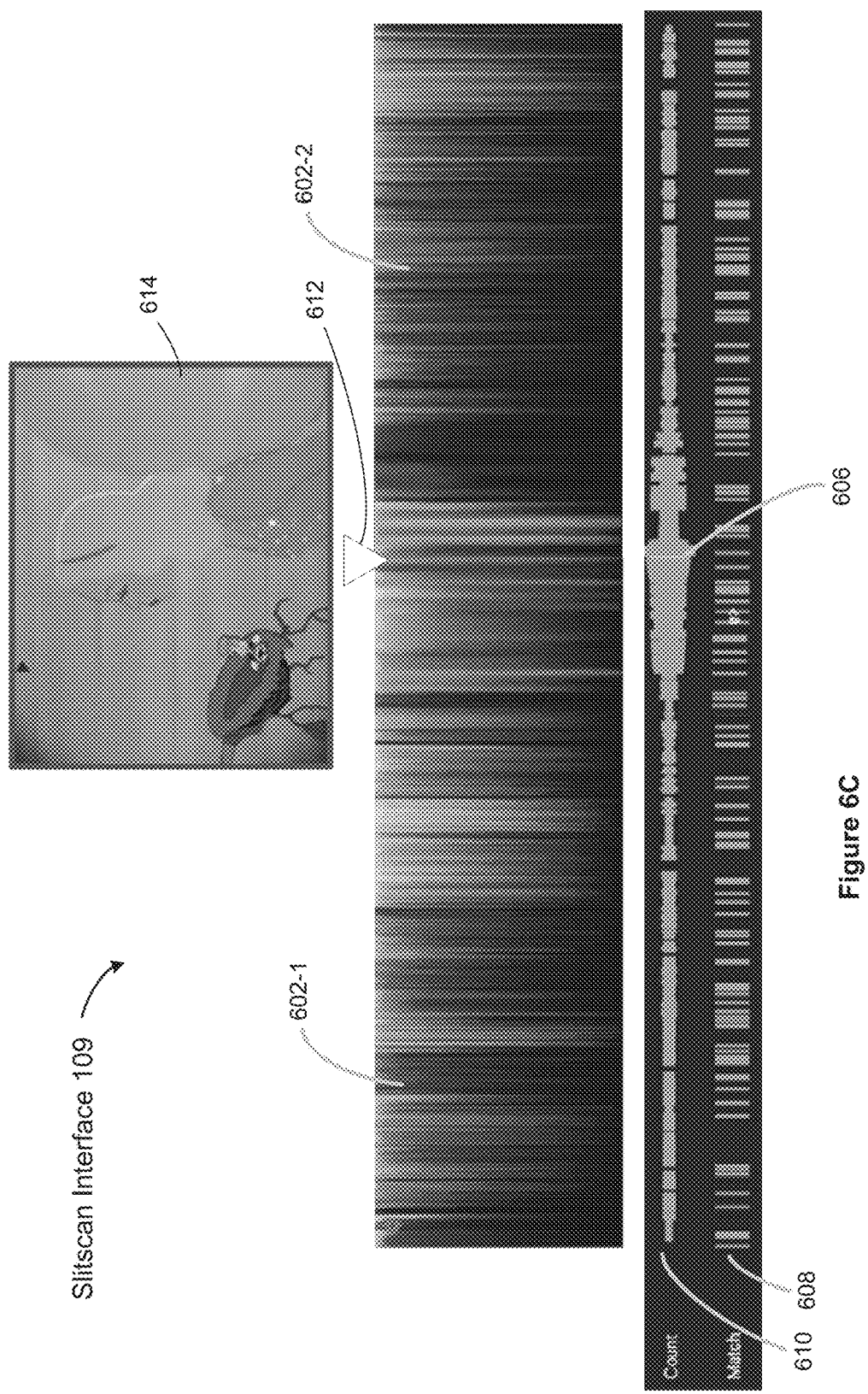

FIGS. 6A-6C illustrate variations of a slitscan interface in accordance with some implementations. In FIG. 6A, the slider thumb 604 moves horizontally within the slitscan graphic, and splits the slitscan graphic into two portions 602-1 and 602-2. In this implementation, the slider 604 itself displays a thumbnail representation of the image at the current location within the slitscan graphic. Typically, implementations update the image on the slider dynamically as it moves. A query is executed to retrieve relevant documents from the document repository when the slider stops moving or is paused for a certain period of time (e.g., 0.5 seconds). In some implementations, each image in the slitscan graphic is directly associated with a query; in other implementations, the images are grouped into segments (usually continuous within the slitscan graphic), and queries are associated with each of the segments.

Typically, the slider is moved using a cursor drag operation or a finger gesture. Some implementations support the use of the cursor keys, which enable fine movements (e.g., move one image for each key press).

Implementations can display one more additional graphics adjacent to the slitscan graphic and slider 604 (e.g., below the graphic). The additional graphics can provide information about the images in the slitscan graphic as well as information about the documents (e.g., images) in the document repository. The first additional graphic 610 indicates the number of documents in the repository corresponding to the queries associated with each of the images in the slitscan graphic. For example, the brighter line 606 indicates the current position of the slider thumb 604, and the thickness of the graphic at this point indicates the relative number of images in the document repository that satisfy the query for the currently select image. In some implementations, a scale is displayed to identify how many documents are matching each query. Note that because of the horizontal size of the slider thumb, the slitscan graphic portions 602-1 and 602-2 extend beyond the ends of the first additional graphic 610. In some implementations, the user can select a point along the first additional graphic 610 (e.g., by clicking or tapping), and the slider thumb 604 is moved to the new location.

The first additional graphic 610 can be precomputed, which is particularly useful if the document repository is static. Regardless of the position of the slider thumb 604, the first addition graphic remains the same.

This example slitscan interface 109 also displays a second additional graphic 608, which is based on just the queries for the images in the slitscan graphic. The second additional graphic 608 is computed by comparing the query for the currently selected image to the queries for all of the other images (generally by comparing the queries for segments). In this example, the presence of a bar at a location in the second graphic 608 indicates that the query at that location matches the query at the currently selected location. Whether two queries are considered matching depends on the implementation and user configured parameters. In some instances, a match requires an exact match between queries. In some instances, two queries with at least one keyword in common are considered matching. This is an example of a binary graphic because the queries either match or they don't. In addition, this is a graphic that dynamically changes because it depends on the current location of the slider thumb. Like the first additional graphic 610, some implementations enable user interaction with the second additional graphic 608, which allows a user to jump to a particular location within the slitscan graphic. In some cases, a user may be able to determine where to look within the slitscan graphic based on the combination of two or more additional graphics.

The slitscan interface 109 in FIG. 6B is similar to the one shown in FIG. 6A, but splits the additional graphs 608 and 610 so that the data represented by a point on the additional graphs is vertically aligned with the corresponding location in the slitscan graphic.

The slitscan interface illustrated in FIG. 6C includes a slider 612 that points to a current location within the slitscan graphic, but does not split the slitscan graphic into two separate pieces. In this implementations, the image corresponding to the current location is displayed in a separate region 614, which is generally placed near the slider 612. In some implementations, the image region 614 moves along with the movement of the slider 612 (e.g., positioned above the slider).

Figure 7:
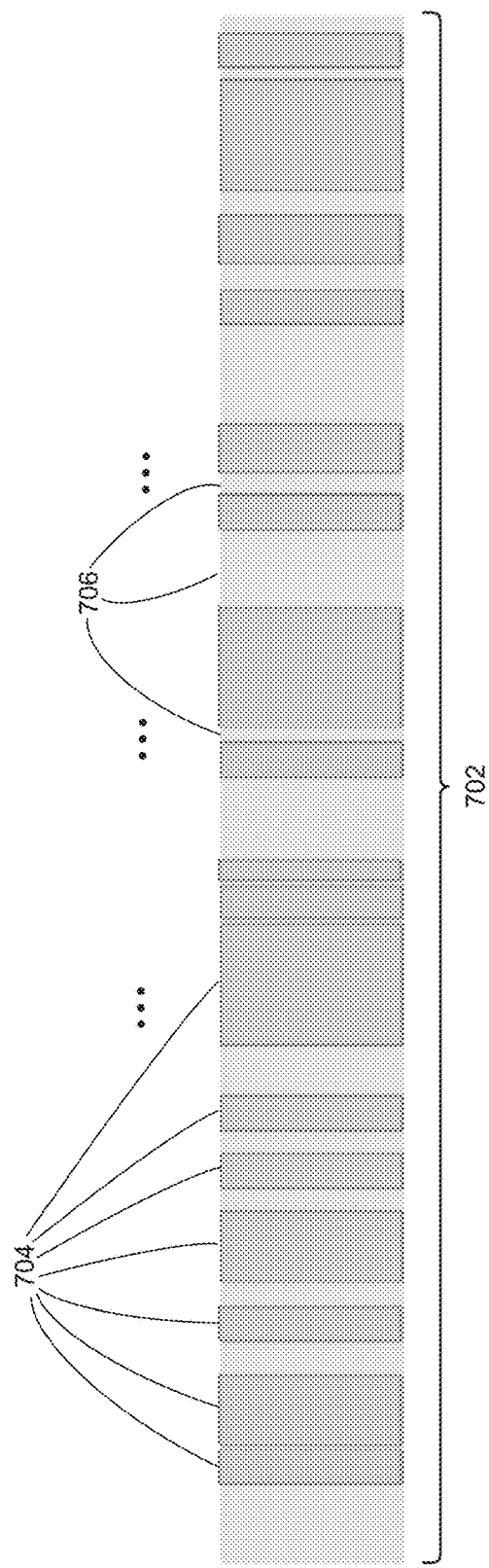
FIG. 7 illustrates coverage of a slitscan visual representation by segments in accordance with some implementations.

FIG. 7 illustrates coverage of a slitscan visual representation 702 by segments 704 in accordance with some implementations. In some instances, the segments completely cover the entire range of the slitscan graphic 702. However, in some instances there are one or more gaps 706 between the segments. When there are gaps, images corresponding to the gaps have no associated query. Alternatively, some implementations use a default general query when an image in the slitscan array is not assigned to a segment.

In this example, the segments have various sizes. This generally occurs when segments are constructed based on the subject matter in the images. For example, in a video, a segment can correspond to a shot at a particular scene.

In some implementations, search segments are created by dividing up the slitscan graphic into equal sized portions that cover the entire graphic. This segmentation works well when most documents in the repository have a data field (e.g., date) corresponding to a data field used for ordering the images in the slitscan graphic. This is not generally true for collections of documents. For example, documents related to a video do not generally have video timecodes. In these cases, it is generally better to generate segments based on keywords.

Although segments are typically contiguous within the slitscan graphic, some implementations allow segments to include multiple contiguous units.

In some implementations, queries can be generated for segments based on knowledge of what data fields are available for the documents in the repository. For example, videos are typically composed of shots and sequences, and the shot and sequence numbers are associated with the documents that were used to construct the video. The timecode for each image can be correlated with scene and shot identifiers, which are used for the segment queries. Some implementations can also use the timecode to correlate images with dialog. The video dialog can be used in the segment queries. In addition, character names (e.g., extracted from closed captions) can be used in the segment queries.

FIGS. 8A and 8B illustrate other graphic representations and data that can be displayed as part of a slitscan user interface 109 in accordance with some implementations. In FIG. 8A, a portion 802 of a slitscan graphic is displayed. A first additional graphic 804 is displayed, and is labeled "Query count in San Francisco" 808. For each image in the slitscan graphic, the first additional graphic 804 shows the number of documents that both satisfy the search query corresponding to the image and were created in San Francisco. This is similar to the count graphic 610 in FIGS. 6A-6C, but the count here is limited by the additional condition. In some instances, documents in the Repository are associated with San Francisco based on GPS coordinates of photographs. In this example, the first additional graphic 804 uses a different display format to show the absolute number. This information could also be displayed in the format of count graphic 610 in FIG. 6A. Note that the first additional graphic does not depend on the current location of the slider.

The second additional graphic 806 compares the city associated with the currently selected graphic (based on the slider) with the city associated with each of the other images. A brighter bar is displayed for a given slit in the slitscan graphic when it associated with the same city as the image at the current location. For example, when the current image was shot in Los Angeles, tick marks are displayed for all of the other images in the slitscan that were shot in Los Angeles. Note that for this additional graphic, the graphic itself changes as the slider moves. The displayed graphic depends on what city is associated with the current slider position. The label "Shot in Same City" 810 indicates what data is being displayed.

FIG. 8B illustrates that some implementations can also display data field values associated with the current image. FIG. 8B shows a portion 902 of a slitscan graphic as well as some additional graphs 924, as described above in FIGS. 6A and 8A. In this particular example, the slitscan graphic represents a well log, and each image has some associated data. The user has selected to display the data representing the well depth for the current image, the average density of the rock in the current image, and an identifier of the rocks or minerals in the current image. This additional data 926 is displayed in proximity to the slitscan graphic, enabling the user to quickly see the information the user needs.

A slitscan graphic, as well as the segments, queries, and additional graphs may change over time for several reasons. For example, the document repository 120 may change, with additional documents added or some documents removed. In addition, the definition of the slitscan graphic itself can change, resulting in a different number of images and/or a different order of images. In some implementations, the user can select a different slit-compression technique, resulting in a different slitscan graphic entirely. The user can also change which additional graphics are displayed, or how the data is displayed. Because of these possible changes, some implementations have a preference for generating the graphics and queries dynamically. However, this is not always possible due to limited resources. Therefore, some implementations trigger a regeneration process at specific times, in response to an import, and/or in response to user changes.

Figure 9A:
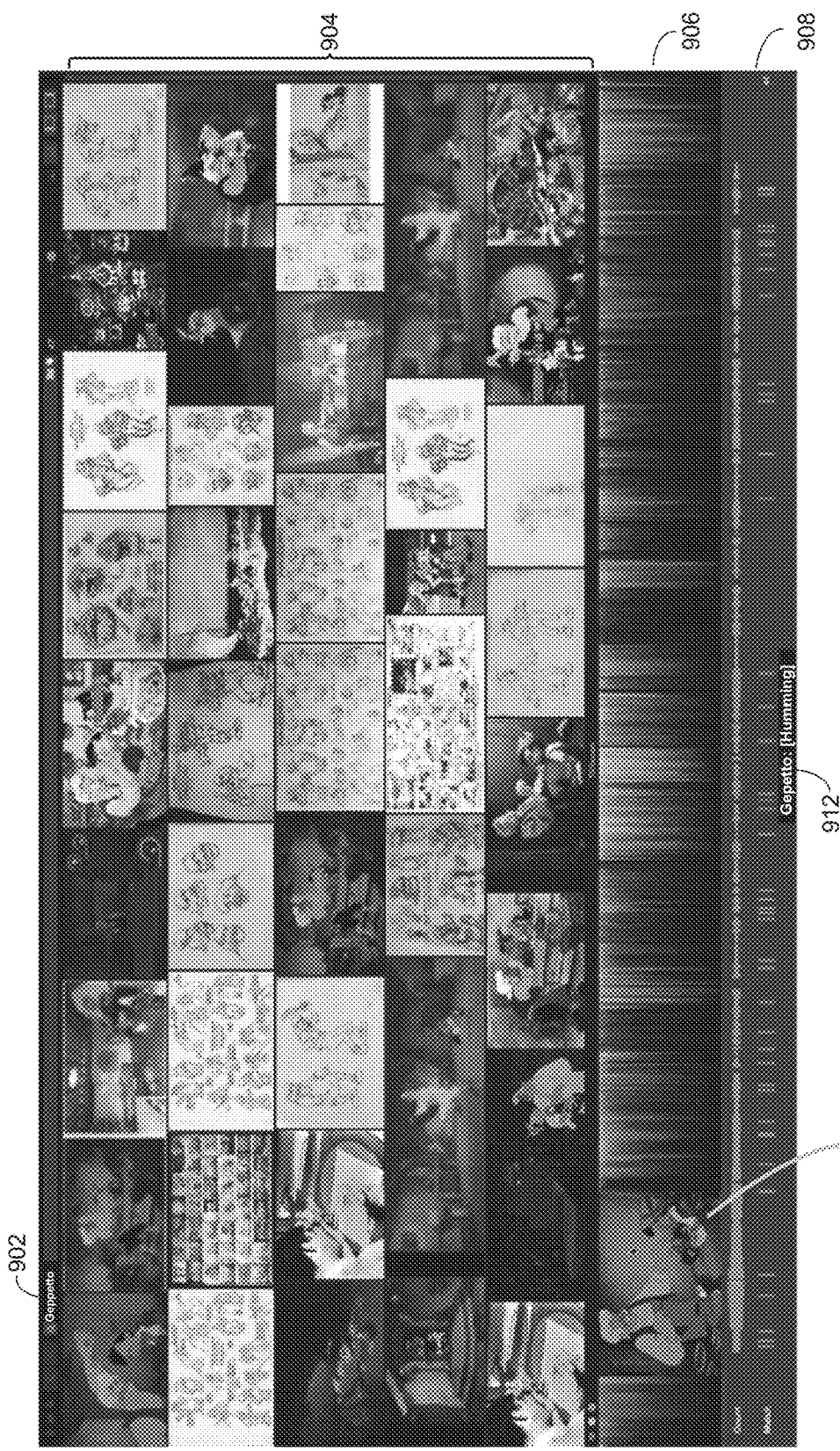
FIGS. 9A and 9B illustrate a slitscan interface within a search application, including search results, in accordance with some implementations.
Figure 9B:
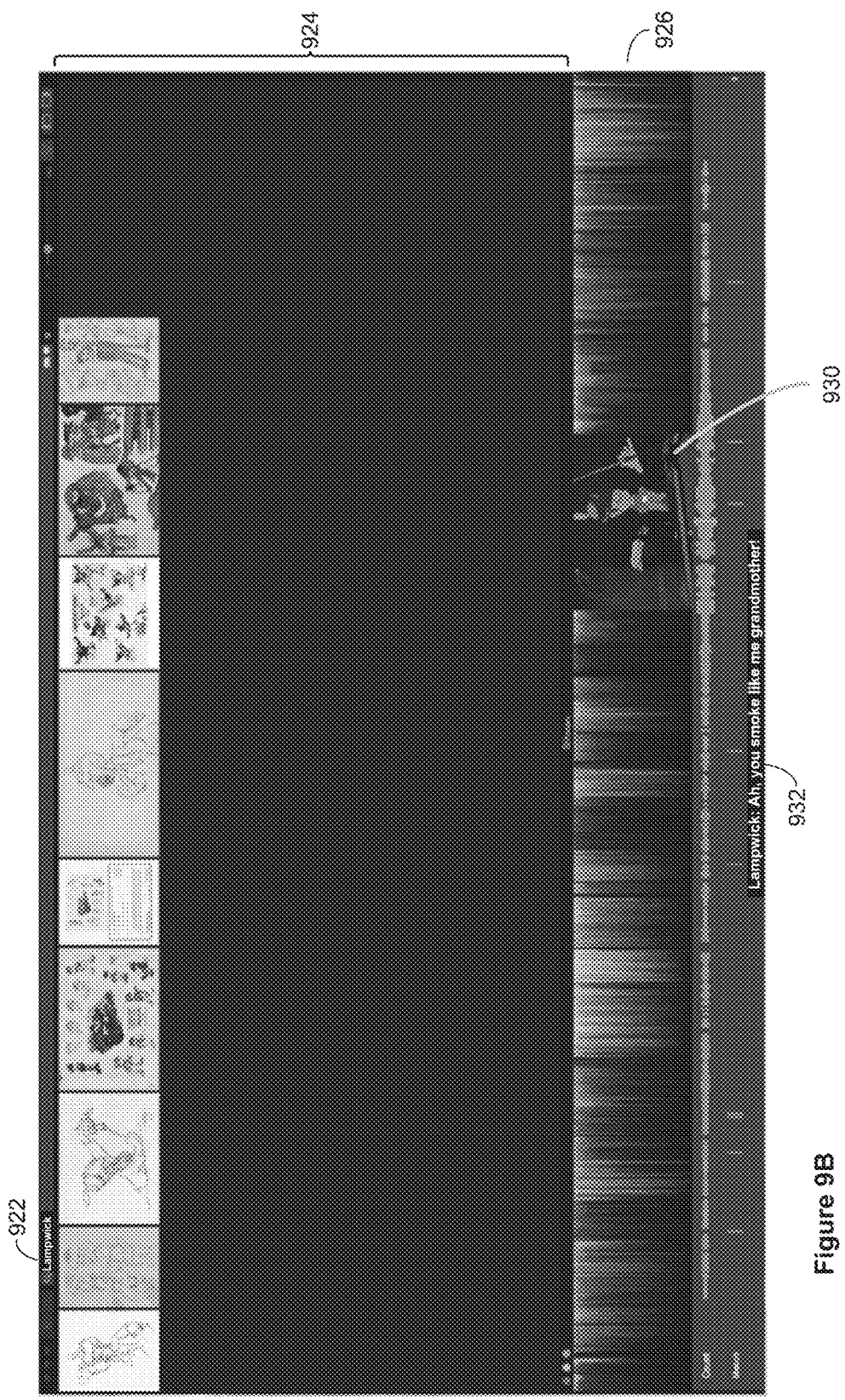

FIGS. 9A and 9B illustrate both the slitscan interface 109 and the query results retrieved based on the selection within the slitscan interface. In FIG. 9A, the user has positioned the slider thumb 910 on a specific image within the slitscan graphic 906. Below the slitscan graphic 906 are additional graphics 908, as illustrated previously in FIGS. 6A-6C. Based on the position of the slider thumb 910 on an image of Geppetto, the search application 106 executes the corresponding query, as shown in the query box 902. The query results are displayed in the document region 904. In this implementation, the slitscan interface 109 also displays the dialog 912 corresponding to the currently selected image, which is how Geppetto was identified for the query.

In FIG. 9B, the user has moved the slider thumb 930 to a different location within the slitscan graphic 926. Based on the captured closed caption dialog 932, the query "Lampwick" is executed in the query box 922. The corresponding images for this character are then displayed in the document area 924.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for querying a document repository, comprising:
   at a computing system having one or more processors and memory:
   displaying a slitscan graphic comprising a concatenated array of slit-compressed images corresponding to an ordered sequence of images, wherein each slit-compressed image is formed by compressing a respective one of the ordered sequence of images to create a respective single line of pixels, the slit-compressed images are concatenated along a single dimension in order according to the ordered sequence of images, and the slit-compressed images are grouped into a plurality of segments;
   associating each segment with a corresponding query that has search terms based on the respective images corresponding to the respective segment;
   displaying a moveable slider that moves along the single dimension and identifies a current location within the slitscan graphic, and displaying a respective thumbnail representation of the respective image corresponding to the respective slit-compressed image at the current location;
   receiving user input to move the moveable slider along the single dimension to a new location; and
   in response to the user action:
   displaying a thumbnail representation of the image corresponding to the slit-compressed image at the new location;
   determining that the new location corresponds to a first segment of the plurality of segments;
   executing the query corresponding to the first segment to retrieve documents from a document repository related to the image corresponding to the slit-compressed image at the new location; and
   displaying the retrieved documents for user selection.

2. The method of claim 1, wherein the ordered sequence of images are frames of a video.

3. The method of claim 2, further comprising generating the respective query for each segment based on respective dialog in the video corresponding to the respective segment.

4. The method of claim 1, wherein the ordered sequence of images are pages within a document.

5. The method of claim 1, wherein the ordered sequence of images is formed by partitioning a single elongated image into a plurality of slices, and the plurality of slices are ordered based on their respective positions within the elongated image.

6. The method of claim 1, wherein the respective thumbnail representation is displayed within the moveable slider, and the moveable slider is displayed within the slitscan graphic, splitting the slitscan graphic into two portions.

7. The method of claim 1, wherein the respective thumbnail representation is displayed in a region distinct from the moveable slider and distinct from the slitscan graphic.

8. The method of claim 1, wherein the single dimension is horizontal, each slit-compressed image is a respective vertical line of pixels, and each pixel in a respective vertical line of pixels is formed by computing a color average of all pixels in a corresponding row of the respective image.

9. The method of claim 1, further comprising downsampling resolution of each of the ordered sequence of images, and forming the respective slit-compressed image using the respective downsampled image.

10. The method of claim 1, wherein computing a color average of all pixels in a corresponding row of the respective image comprises computing a dominant color of all pixels in the corresponding row of the respective image.

11. The method of claim 9, wherein computing a color average of all pixels in a corresponding row of the respective image comprises computing a dominant color of all pixels in the corresponding row of the respective image.

12. The method of claim 1, wherein the displayed thumbnail image updates dynamically while a user moves the moveable slider, displaying a thumbnail image corresponding to locations of the moveable slider as it moves.

13. The method of claim 1, further comprising displaying a graphic representation of counts of query results corresponding to each slit-compressed image in the slitscan graphic, wherein the graphic representation is visually aligned with the slitscan graphic.

14. The method of claim 1, further comprising:
   retrieving data values for a data field that stores data for the ordered sequence of images; and
   displaying a graphic representation of the retrieved data values visually aligned with the slitscan graphic.

15. The method of claim 1, further comprising:
   retrieving data values for a plurality of data fields that store data for the ordered sequence of images; and displaying retrieved data values for the plurality of fields corresponding to the image represented by the current location of the moveable slider.

16. The method of claim 1, further comprising in response to the user action:
  displaying a binary graphic representation that identifies which slit-compressed images in the slitscan graphic have queries that match the query corresponding to the first segment.

17. The method of claim 15, wherein a respective query matches the query corresponding to the first segment when there is at least one keyword that appears in both the respective query and the query corresponding to the first segment.

18. A computer system, comprising:
  one or more processors;
  memory; and
  one or more programs stored in the memory and configured for execution by the one or more processors, the one or more programs comprising instructions for:
    displaying a slitscan graphic comprising a concatenated array of slit-compressed images corresponding to an ordered sequence of images, wherein each slit-compressed image is formed by compressing a respective one of the ordered sequence of images to create a respective single line of pixels, the slit-compressed images are concatenated along a single dimension in order according to the ordered sequence of images, and the slit-compressed images are grouped into a plurality of segments;
    associating each segment with a corresponding query that has search terms based on the respective images corresponding to the respective segment;
    displaying a moveable slider that moves along the single dimension and identifies a current location within the slitscan graphic, and displaying a respective thumbnail representation of the respective image corresponding to the respective slit-compressed image at the current location;
    receiving user input to move the moveable slider along the single dimension to a new location; and
    in response to the user action:
      displaying a thumbnail representation of the image corresponding to the slit-compressed image at the new location;
      determining that the new location corresponds to a first segment of the plurality of segments;
      executing the query corresponding to the first segment to retrieve documents from a document repository related to the image corresponding to the slit-compressed image at the new location; and
      displaying the retrieved documents for user selection.

19. A non-transitory computer readable storage medium storing one or more programs configured for execution by one or more processors of a computer system, the one or more programs comprising instructions for:
  displaying a slitscan graphic comprising a concatenated array of slit-compressed images corresponding to an ordered sequence of images, wherein each slit-compressed image is formed by compressing a respective one of the ordered sequence of images to create a respective single line of pixels, the slit-compressed images are concatenated along a single dimension in order according to the ordered sequence of images, and the slit-compressed images are grouped into a plurality of segments;
  associating each segment with a corresponding query that has search terms based on the respective images corresponding to the respective segment; displaying a moveable slider that moves along the single dimension and identifies a current location within the slitscan graphic, and displaying a respective thumbnail representation of the respective image corresponding to the respective slit-compressed image at the current location;
  receiving user input to move the moveable slider along the single dimension to a new location; and
  in response to the user action:
    displaying a thumbnail representation of the image corresponding to the slit-compressed image at the new location;
    determining that the new location corresponds to a first segment of the plurality of segments;
    executing the query corresponding to the first segment to retrieve documents from a document repository related to the image corresponding to the slit-compressed image at the new location; and
    displaying the retrieved documents for user selection.

* * * * *